United States Patent Office 2,961,331
Patented Nov. 22, 1960

2,961,331
DRIER COMPOSITIONS

Gordon Kirke Wheeler, Trumbull, Conn., assignor to R. T. Vanderbilt Company, Inc., New York, N.Y., a corporation of New York No Drawing. Filed Oct. 3, 1958, Ser. No. 765,046

9 Claims. (Cl. 106—310)

The present invention pertains to compositions of matter, and more particularly to drier compositions.

Coating compositions, such as paints, printing inks, linoleum print paints, varnishes and enamels, contain a film-forming base, typical examples of which include drying or semi-drying oils, such as linseed oil, dehydrated caster oil, soya bean oil, oiticica oil etc.; esters of the acids derived from the drying or semi-drying oils and polyhydric alcohols, such as glycerol, ethylene glycol, sorbitol, etc.; the pure esters of the drying or semi-drying oil fatty acids, such as linoleic acid, oleic acid, etc., and polyhydric alcohols, such as ethylene glycol, glycerol, mannitol, etc.; drying or semi-drying oil modified resins, such as the modified alkyd resins prepared, for example, by the esterification of glycerol, phthalic anhydride and the drying or semi-drying oil fatty acids; the modified phenolic resins prepared, for example, by the reaction of cresols, formaldehyde and the drying or semi-drying oils; the modified esters of rosin or modified rosins prepared, for example, by the esterification of rosin, glycerol or pentaerythritol and the drying or semi-drying oil fatty acids; modified latex emulsions, such as butadiene-styrene copolymers; and other conventional film-forming bases. These coating compositions may also contain pigments, such as titanium dioxide, carbon black, etc.; extenders and fillers, such as calcium carbonate, wood flour, clay, etc.; resins, such as urea formaldehyde, rosin, etc.; solvents, such as toluene, xylol, turpentine, etc.; thinners such as mineral spirits; and plasticizers, etc.

In order to decrease the drying time of such coating compositions it has been the practice heretofore to incorporate therein conventional metallic driers which are metal salts of carboxylic acids, typical examples of which include naphthenates, oleates, linoleates, octoates, and resinates of manganese, lead, cobalt, calcium and iron. While such metallic driers decrease the drying time of the coating compositions, such compositions, nevertheless, still have an excessively high drying rate for many applications. Moreover, such coating compositions containing a metallic drier frequently exhibit poor drying time stability upon aging of the compositions. Similarly, coating compositions, such as aged modified latex paints, containing a metallic drier give poor results when subjected to scrubbability tests.

Accordingly, it is the object of the present invention to provide drier compositions which will impart decreased drying time to coating compositions, which will give the coating compositions drying time stability even after ageing thereof, and which will greatly improve the scrubbability of coating compositions, such as aged modified latex paint.

The drier compositions of the present invention comprise a metallic drier and a modifier or accelerator for the metallic drier to increase the drying activity thereof. The metallic drier is a metal salt of a carboxylic acid, such as naphthenates, oleates, linoleates, octoates, and resinates of manganese, lead, cobalt, calcium and iron.

The modifier or accelerator for the metallic drier is an α-substituted pyridine compound as set forth below.

2-(2-pyridyl)-benzimidazole

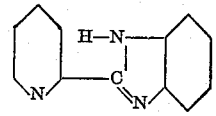

1-(2-pyridylazo)-2-naphthol

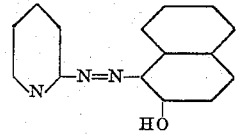

2-picolylamine

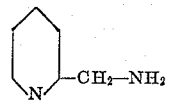

2,2'-dipyridylamine

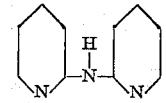

2-pyridinemethaldoxime

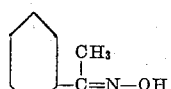

2-pyridinealdoxime

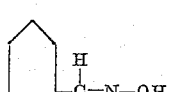

2-(2-pyridyl)-benzoxazole

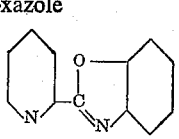

2-pyridinaldazine

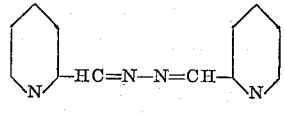

bis-(2-pyridinal)-ethylenediamine

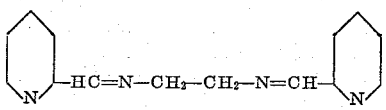

While the above α-substituted pyridine compounds function as modifiers or accelerators for a metallic drier, it was found that the following α-substituted pyridine compounds did not so function, but rather they actually increased the drying time of coating compositions containing a metallic drier: 2-pyridinal aniline, 2-cyanopyridine, mono-(2-pyridinal)-p-phenylenediamine, and 2,6-pyridine dicarboxylic acid.

The amounts of metallic drier and modifier or accelerator present in the drier compositions vary with the nature of the film-forming base present in the coating compositions to which the drier compositions are to be added as well as with the presence or absence of other compatible adjuvants present in the coating compositions. In general, however, the weight ratio of modifier or accelerator to the metal content in the metallic drier lies in the range from about 0.1:1 to about 61:1, and preferably in the range from about 2:1 to about 30:1.

The drier compositions can be prepared merely by mixing the metallic drier with the accelerator or modifier, or by dissolving them in a suitable common solvent which does not have an adverse effect upon the film-forming base present in the coating compositions. If desired, the metallic drier and the modifier or accelerator therefor can be added separately to a coating composition to form the drier composition therein.

The amount of the drier compositions which is used in coating compositions containing a film-forming base is a very small amount, for example, 0.02% by weight of metal based on the weight of the film-forming base.

The drier compositions of the present invention will be further illustrated in connection with the following examples which employed a typical metallic drier, namely manganese naphthenate, and a typical film-forming base or vehicle of a coating composition, namely "Aroplaz 2464" which is a medium length, soya bean oil, phthalic alkyd resin having petroleum spirits as a solvent and containing 49–51% solids, 49% oil acids and 34% phthalic anhydride.

EXAMPLES 1 THROUGH 10

Aroplaz 2464 was reduced from 50% to 44.5% solids with mineral spirits and divided into ten equal portions. To the first portion, which served as a blank for comparison purposes, there was added a 6% manganese naphthenate solution in an amount such that the vehicle contained 0.02% by weight of manganese based on the nonvolatile content of the vehicle. To the remaining nine portions there were separately added drier compositions of the invention containing both manganese naphthenate and a modifier or accelerator therefor as identified below in an amount such that the vehicle also contained 0.02% by weight of manganese based on the nonvolatile content of the vehicle. The ten mixtures were immediately cast as clear, unpigmented films on plate glass at 2.2 mils wet film thickness using a 0.004 inch clearance applicator blade. The drying times were measured on a Gardner Drygraph in an air conditioned room kept at a temperature of 74° F. and at 50% relative humidity. After aging for a period of two months, drying times were again determined on similar films of the same identical ten mixtures, in order to determine the drying time stability of the compositions. The data for these two tests are set forth in Table I below.

The data set forth in the fifth column of Table I below show that the drier compositions of the invention (Examples 2–10) containing an accelerator or modifier impart to film-forming bases of coating compositions a drying time considerably less than that imparted thereto by a metallic drier alone (Example 1) and accordingly demonstrate that the modifiers do accelerate or increase the drying action of a metallic drier upon a film-forming base. Coating compositions containing the drier compositions of the invention also have good drying time stability even after aging thereof as shown by the data in the fifth and sixth columns of Table I above for each of Examples 2–10 respectively.

EXAMPLE 11

Scrubbability tests using 2,2'-dipyridylamine were carried out on an alkyd-modified latex emulsion paint by a method similar to that described in Federal Specification TT-P-0029, scrubbability, thus measured, being considered an index of the progress of curing or drying of the film. These tests were run on a 4-gang Gardner Model 105 Straight Line Washability and Abrasion Machine. The plate glass panels were primed with a commercial enamel undercoater tinted medium grey. The undercoater was air-dried two days (at 74° F., 50% relative humidity), baked two hours at 250° F., then allowed to air dry at least one day more before applying the test paint. The undercoater and test paint (aged two days) were applied, using a Dow Film Caster which delivers a dry film thickness of approximately 2.2 mils (undercoater) and 1.8 mils (test paint), to four such undercoated panels and allowed to air dry three days. These films were then "scrubbed" to failure or, if no failure occurred, to a maximum of 6000 cycles. One-half of one percent Ivory soap solution was used as a lubricant, the solution being added frequently so as to keep the test paint surface properly wetted at all times. The results of these quadruplicate tests were averaged and entered in a table of observations set forth below.

After aging for six weeks, the paints were retested for scrubbability in the same manner as above. The formula used in this study is as follows with ingredients listed in order of addition:

*Alkyd emulsion*

| | Pounds | Gallons |
|---|---|---|
| 1. Long oil soya alkyd (100% solids) | 27.10 | 3.25 |
| 2. Metallic Drier (6% Cobalt naphthenate) | 0.45 | 0.04 |
| 3. Ammonium hydroxide (28%) | 1.63 | 0.22 |
| 4. Triton X-100 (a nonionic wetting agent of the octylphenox ethanol type) | 2.71 | 0.26 |
| 5. Dowicide A/G preservative (20% solution) (50–50% orthophenylphenol sodium salt, pentachlorophenol sodium salt) | 10.94 | 1.43 |
| 6. Protein thickener (15% solution) (Cascoloid—a potassium hydroxide cut casein) | 83.10 | 9.56 |
| Pigment dispersion | | |
| 7. Water | 119.00 | 14.29 |
| 8. Tetrapotassium pyrophosphate (10%) | 15.55 | 1.71 |
| 9. Titanium dioxide (rutile) | 250.00 | 7.14 |
| 10. Magnesium silicate | 168.00 | 7.07 |
| 11. Lithopone | 100.00 | 2.79 |
| Reduction | | |
| 12. Water | 207.50 | 24.92 |
| 13. Antifoamer (40%) (Nopco 1407) | 4.33 | 0.52 |
| 14. Styrene-butadiene (67/33) latex (48%) | 226.00 | 26.80 |
| | 1,216.31 | 100.00 |

*Table I*

| Example No. | Modifier or Accelerator | Manganese (Percent by weight) | Weight Ratio of Modifier to Manganese | Drygraph—Hours | |
|---|---|---|---|---|---|
| | | | | Initial | 2 Months |
| 1 | None (blank) | 0.02 | | 21 | 16 |
| 2 | 2-(2-Pyridyl)-benzimidazole | 0.02 | 15.2/1.0 | 4.7 | 4.2 |
| 3 | 1-(2-Pyridylazo)-2-naphthol | 0.02 | 7.6/1.0 | 8.0 | 4.3 |
| 4 | 2-Picolylamine | 0.02 | 30.4/1.0 | 4.1 | 6.1 |
| 5 | 2,2'-Dipyridylamine | 0.02 | 30.4/1.0 | 5.0 | 4.0 |
| 6 | 2-Pyridinemethaldoxime | 0.02 | 1.9/1.0 | 14 | 12 |
| 7 | 2-Pyridinealdoxime | 0.02 | 1.9/1.0 | 16 | 14 |
| 8 | 2-(2-Pyridyl)-benzoxazole | 0.02 | 3.8/1.0 | 17 | 12 |
| 9 | 2-Pyridinaldazine | 0.02 | 15.2/1.0 | 11 | 6.0 |
| 10 | Bis-(2-pyridinal)-ethylenediamine | 0.02 | 30.4/1.0 | 11 | 9.0 |

2,2'-dipyridylamine was added to the finished paint as a 5% solution (by weight) in hexyleneglycol.

*Table of observations*

| Mixture No. | Percent (on wt. of alkyd modifier) | | Weight Ratio: Amine/Metal | Gardner Scrubbability (Cycles to Failure) | |
|---|---|---|---|---|---|
| | Cobalt Metal | 2,2'-Dipyridylamine | | Fresh Paint | Paint Aged 6 Weeks |
| A | 0.1 | | | 135 | 103 |
| B | 0.1 | 0.076 | 0.76/1 | 116 | 265 |
| C | 0.1 | 0.152 | 1.52/1 | 171 | 372 |
| D | 0.1 | 0.304 | 3.04/1 | 563 | 853 |
| E | 0.1 | 0.608 | 6.08/1 | 1,788 | 1,745 |

It will be noted from the data in the above table that the use of a typical aforementioned α-substituted pyridine compound, namely 2,2'-dipyridylamine, with a typical metallic drier, namely cobalt naphthenate, improves the scrubbability of the modified latex paint to a very considerable degree. It is believed that these α-substituted pyridine compounds function by giving a higher degree of cure of the film, both initially and upon aging of the composition. Possibly this higher degree of cure results in improved adhesion of the film to the substrate.

It will be appreciated that various modifications and changes may be made in the invention set forth herein without departing from the spirit thereof and accordingly the invention is to be limited only within the scope of the appended claims.

I claim:

1. A drier composition for decreasing the drying time of coating compositions consisting essentially of a metallic drier and an α-substituted pyridine compound as an accelerator therefor selected from the group consisting of 2-(2-pyridyl)-benzimidazole, 1-(2-pyridylazo)-2-naphthol, 2-picolylamine, 2,2'-dipyridylamine, 2-pyridinemethaldoxime, 2-pyridinealdoxime, 2-(2-pyridyl)-benzoxazole, 2-pyridinaldazine, and bis-(2-pyridinal)-ethylenediamine; the weight ratio of the accelerator to the metal content in the metallic drier lying in the range from about 0.1:1 to about 61:1.

2. A drier composition as set forth in claim 1 wherein the weight ratio of the accelerator to the metal content in the metallic drier lies in the range from about 2:1 to about 30:1.

3. A drier composition as set forth in claim 1 wherein the metallic drier is manganese naphthenate.

4. A drier composition as set forth in claim 1 wherein the metallic drier is cobalt naphthenate.

5. A drier composition as set forth in claim 1 wherein the accelerator is 2-(2-pyridyl)-benzimidazole.

6. A drier composition as set forth in claim 1 wherein the accelerator is 1-(2-pyridylazo)-2-naphthol.

7. A drier composition as set forth in claim 1 wherein the accelerator is 2-picolylamine.

8. A drier composition as set forth in claim 1 wherein the accelerator is 2,2'-dipyridylamine.

9. A drier composition as set forth in claim 1 wherein the accelerator is 2-pyridinaldazine.

References Cited in the file of this patent

UNITED STATES PATENTS

| 2,075,230 | Schatz | Mar. 30, 1937 |
| 2,526,718 | Wheeler | Oct. 24, 1950 |
| 2,852,405 | Myers et al. | Sept. 16, 1958 |

FOREIGN PATENTS

| 498,011 | Great Britain | Dec. 29, 1938 |
| 509,767 | Canada | Feb. 1, 1955 |